(12) United States Patent
Mudireddy et al.

(10) Patent No.: US 7,870,231 B2
(45) Date of Patent: Jan. 11, 2011

(54) EFFICIENTLY ASSIGNING PRECEDENCE VALUES TO NEW AND EXISTING QOS FILTERS

(75) Inventors: Srinivas Reddy Mudireddy, San Diego, CA (US); Bibhu P. Mohanty, San Diego, CA (US); Venkata Satish Kumar Vangala, Longmont, CO (US); Uppinder Singh Babbar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1114 days.

(21) Appl. No.: 11/491,211

(22) Filed: Jul. 21, 2006

(65) Prior Publication Data

US 2008/0019275 A1 Jan. 24, 2008

(51) Int. Cl.
*G06F 15/177* (2006.01)
(52) U.S. Cl. .............................. 709/220; 709/221
(58) Field of Classification Search .................. None
See application file for complete search history.

(56) References Cited

U.S. PATENT DOCUMENTS

| 2003/0169771 | A1* | 9/2003 | Ahn et al. ................... 370/497 |
| 2005/0201324 | A1* | 9/2005 | Zheng ........................ 370/328 |
| 2006/0153079 | A1* | 7/2006 | Yoon et al. .................. 370/235 |
| 2006/0291449 | A1* | 12/2006 | Babbar et al. ............... 370/352 |
| 2007/0058545 | A1* | 3/2007 | Nookala et al. ............. 370/230 |

FOREIGN PATENT DOCUMENTS

WO 0163855 8/2001

OTHER PUBLICATIONS

Bilgic M et al., "Quality of Service in General Packet Radio Service," Mobile Multimedia Communications 1999, 1999 IEEE International Workshop on San Diego. CA, USA Nov. 15-17, 1999, Nov. 15, 1999, pp. 226-231, IEEE, Piscataway, NJ, USA, XP010370727.
International Search Report, PCT/US07/074037, International Search Authority, European Patent Office, Apr. 3, 2008.
Written Opinion, PCT/US07/074037, International Search Authority, European Patent Office, Apr. 3, 2008.

* cited by examiner

*Primary Examiner*—Hassan Phillips
(74) *Attorney, Agent, or Firm*—Howard H. Seo; James T. Hagler

(57) ABSTRACT

A wireless data network delivers packets from a network router to a mobile station so that each application running on the mobile station receives an adequate quality of service (QoS). The mobile station sends configuration messages to the network router containing prioritized filters associated with each application. The router filters incoming IP packets into IP flows having the appropriate QoS for the corresponding application. The configuration messages consume valuable air interface resources. Network resources are conserved by assigning precedence values to filters in such a way that fewer configuration messages are needed to reorder the filters when new filters are added. Precedence values for existing filters are spread out in one portion of the precedence space. When the precedence values in that portion are insufficient to accommodate new filters with the correct priority, both new and existing filters are reassigned precedence values in an unassigned portion of the precedence space.

37 Claims, 9 Drawing Sheets

| 0 1 2 3 4 5 6 7 | 0 1 2 3 4 5 6 7 | 0 1 2 3 4 5 6 7 | 0 1 2 3 4 5 6 7 |
|---|---|---|---|
| MSIPv4 ADDRESS | | | |
| | | TFT OPERATION CODE | NUMBER OF PACKET FILTERS |

FILTER #1:
- FLOW_ID
- PACKET FILTER EVALUATION PRECEDENCE
- PACKET FILTER LENGTH
- PACKET FILTER CONTENT
- PACKET FILTER TREATMENT
- FLOW TREATMENT SPECIFICATION

FILTER #2:
- FLOW_ID
- PACKET FILTER EVALUATION PRECEDENCE
- PACKET FILTER LENGTH
- PACKET FILTER CONTENT
- PACKET FILTER TREATMENT
- FLOW TREATMENT SPECIFICATION

FILTER #3:
- FLOW_ID
- PACKET FILTER EVALUATION PRECEDENCE
- PACKET FILTER LENGTH
- PACKET FILTER CONTENT
- PACKET FILTER TREATMENT
- FLOW TREATMENT SPECIFICATION

TRAFFIC FLOW TEMPLATE INFORMATION
ELEMENT (TFT IE) IN RSVP Resv MESSAGE

FIG. 4

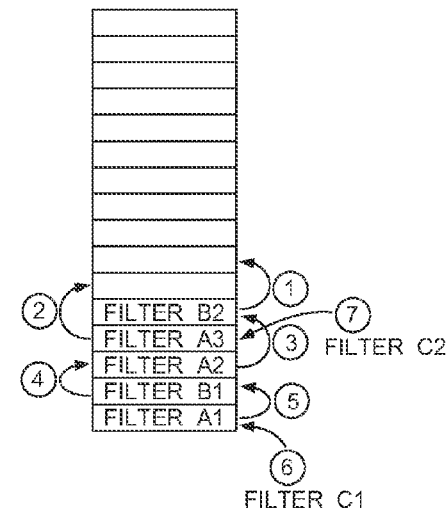

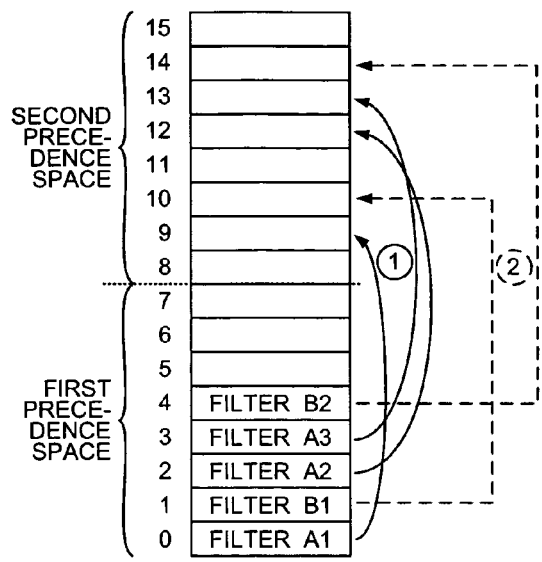 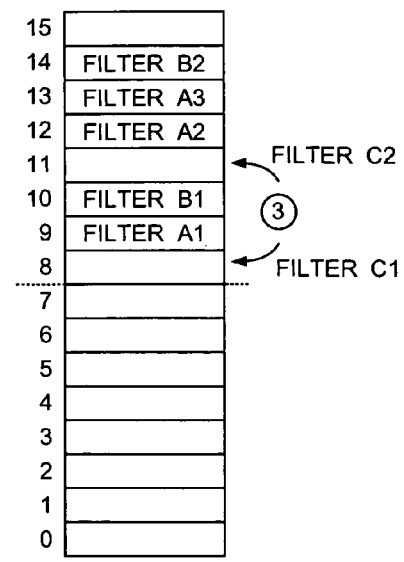
FIG. 9A  FIG. 9B
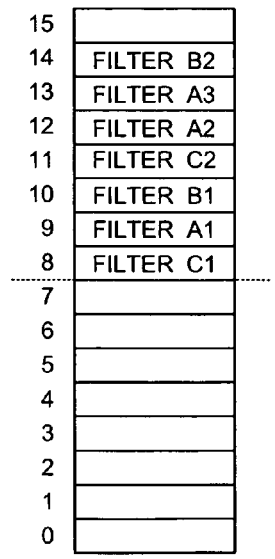
FIG. 9C

| | |
|---|---|
| 24 | |
| 23 | FILTER 16 |
| 22 | FILTER 15 |
| 21 | FILTER 14 |
| 20 | |
| 19 | FILTER 13 |
| 18 | FILTER 12 |
| 17 | |
| 16 | FILTER 11 |
| 15 | FILTER 10 |
| 14 | |
| 13 | FILTER 9 |
| 12 | FILTER 8 |
| 11 | |
| 10 | FILTER 7 |
| 9 | FILTER 6 |
| 8 | |
| 7 | FILTER 5 |
| 6 | FILTER 4 |
| 5 | |
| 4 | FILTER 3 |
| 3 | FILTER 2 |
| 2 | |
| 1 | FILTER 1 |

FIG. 11A

| | |
|---|---|
| 24 | |
| 23 | |
| 22 | |
| 21 | |
| 20 | |
| 19 | |
| 18 | |
| 17 | |
| 16 | FILTER 16 |
| 15 | FILTER 15 |
| 14 | FILTER 14 |
| 13 | FILTER 13 |
| 12 | FILTER 12 |
| 11 | FILTER 11 |
| 10 | FILTER 10 |
| 9 | FILTER 9 |
| 8 | FILTER 8 |
| 7 | FILTER 7 |
| 6 | FILTER 6 |
| 5 | FILTER 5 |
| 4 | FILTER 4 |
| 3 | FILTER 3 |
| 2 | FILTER 2 |
| 1 | FILTER 1 |

FIG. 11B

EFFICIENTLY ASSIGNING PRECEDENCE VALUES TO NEW AND EXISTING QOS FILTERS

BACKGROUND

1. Field

The present disclosure relates generally to wireless data networks and, more specifically, to filtering data packets into an IP flow that exhibits the appropriate quality of service.

2. Background

Unlike traditional wireless networks that create a physical path between receiving and sending devices, wireless data networks use Internet protocol (IP) to break up data into small pieces called packets. Packets are allowed to take different paths to the same destination. Some packets can be prioritized and used to provide high-speed data services, such as voice-over-IP (VoIP), streaming video and video telephony.

Some applications may require a higher Quality of Service (QoS), whereas other applications may tolerate a lower QoS. An application that requires a high QoS might require packets to be delivered with little delay or with little delay between packets once the first packet is delivered. For example, the delay in delivering packets used to provide a VoIP phone call would be less than for packets used to deliver an e-mail.

The two major third generation wireless standards that specify the characteristics of wireless data networks are the cdma2000 1×EV-DO (Evolution, Data Only) standard promulgated by the "$3^{rd}$ Generation Partnership Project 2" (3GPP2) and the W-CDMA standard proposed by the "$3^{rd}$ Generation Partnership Project" (3GPP). The Telecommunication Industry Association has named the cdma2000 1×EV-DO standard the "CDMA2000, High Rate Packet Data Air Interface Specification" and assigned it the specification number 3GPP2 C.S0024-A. The European Telecommunications Standards Institute (ETSI) has assigned wideband CDMA (W-CDMA) the technical standard number ETSI TS 24 008. W-CDMA is sometimes referred to as Universal Mobile Telecommunications System (UMTS).

Packets are transmitted across wireless data networks in packet data flows. Each packet data flow is characterized by a particular QoS. Each high-speed data application running on a mobile station, such as a cell phone, receives packets from a packet data flow that has the appropriate QoS. For example, a mobile station running three applications that require different qualities of service would receive packets across three packet data flows. When the wireless data network receives packets from an external IP network, a router in the mobile network filters those packets to determine which packets should be forwarded in which available data flow to the mobile station. Each time an application is launched on the mobile station, the mobile station sends configuration messages to the router defining a "flow specification" for the data flow used by the application and a "filter specification" for filtering the packets communicated to the application. Packet filters are installed in the router and classify packets received from the external IP network. The packet filters are applied to the packets in an appropriate order such that each packet is routed through a packet data flow that exhibits the correct QoS for the corresponding application. Each filter is assigned a precedence value by the mobile station, and the order in which filters are applied to packets received from the external IP network depends on the precedence value.

When a new application is launched or when an existing application modifies its filters, the mobile station assigns a precedence value to each new filter so that both the new and the existing filters are applied to the incoming packets in the correct order. If the mobile station must assign to a new filter a precedence value that is already assigned to an existing filter, the mobile station must send additional configuration messages to reassign the precedence values of the existing filters before installing the new filter on the router. Sending configuration messages consumes air interface resources, which is undesirable. As more wireless networks evolve into wireless data networks and high-speed data services become more popular, the number of packet filters installed on routers in the mobile networks will increase. Consequently, there will be a higher probability that the precedence value assigned to each newly installed filter will conflict with the precedence value of an existing filter, and the number of configuration messages required to reassign precedence values will increase.

A method is sought for reducing the number of configuration messages required to reassign precedence values when the precedence value assigned to a newly installed filter conflicts with the precedence value of an existing filter.

SUMMARY

A wireless data network delivers data packets from a network router to a mobile station in a manner that allows each application running on the mobile station to receive an adequate level of QoS. The mobile station sends configuration messages to the network router containing packet filters and the priorities of those filters. The network router uses the packet filters to filter incoming IP packets into the correct packet data flow. A packet data flow includes one or more IP flows and exhibits the appropriate QoS for the corresponding application running on the mobile station. The configuration messages consume valuable air interface resources. System software on the mobile station sets the priorities of the packet filters by assigning precedence values in such a way that fewer configuration messages are needed when a new or running application installs new filters. Precedence values are assigned to existing filters in such a way that in most cases the precedence values of the existing filters need not be reassigned when new filters are installed. Precedence values are also assigned in such a way that fewer configuration messages are needed to reorder existing filters when there is a conflict in the precedence value assigned to an existing and a new filter. Fewer configuration messages are needed to reorder existing filters in order to accommodate a new filter that must receive the precedence value originally assigned to an existing filter. Network resources are thereby conserved.

The total precedence space is divided into portions. Precedence values for a first group of filters are spread out over a first portion of the precedence space. By spreading out the precedence values assigned to the packet filters, the probability is decreased that there will be insufficient unassigned precedence values when a precedence value is assigned to a new filter used by an additional application. When there are insufficient precedence values in the first portion of the precedence space to accommodate new filters in the correct priority, both new and existing filters are reassigned precedence values in a second completely unassigned portion of the total precedence space. The new and existing filters are also spread out over the unassigned portion.

In one embodiment, the total precedence space has $2*P$ values, the first portion of the precedence space covers a range of precedence values from zero through $P-1$, and the second unassigned portion of the precedence space covers a range of precedence values from $P$ through $(2*P)-1$.

In another embodiment, N packet filters are spread out over a precedence space having P unassigned precedence values with a range from one through P. Each nth packet filter from one through N is assigned a precedence value approximately equaling n*[(P+1)/(N+1)]. The N packet filters are communicated from a mobile station to a network router.

In yet another embodiment, N packet filters are spread out over a precedence space having P unassigned precedence values by assigning precedence values to each of the N packet filters such that there are approximately one less than (P+1)/(N+1) unassigned precedence values between each assigned precedence value.

In one embodiment, the wireless data network conforms to the 1×EV-DO standard, the network router is a packet data serving node (PDSN), the configuration messages conform to the Resource Reservation Protocol (RSVP), and the packet filters and precedence values are communicated from the mobile station to the network router in an RSVP Resv message.

In another embodiment, the wireless data network conforms to the W-CDMA standard, the network router is a GPRS gateway serving node (GGSN), and the packet filters and precedence values are communicated from the mobile station to the network router in a GPRS Session Management Message.

The foregoing is a summary and thus contains, by necessity, simplifications, generalizations and omissions of detail. Consequently, those skilled in the art will appreciate that the summary is illustrative only and does not purport to be in any way limiting. Other aspects, inventive features, and advantages of the devices and/or processes described herein, as defined solely by the claims, will become apparent in the non-limiting detailed description set forth herein.

BRIEF DESCRIPTION OF THE DRAWINGS

The accompanying drawings, where like numerals indicate like components, illustrate embodiments of the devices and/or processes described herein.

FIG. 4 is a diagram of the format of a traffic flow template information element (TFT IE) in an RSVP Resv message sent from the mobile station to the network router of FIG. 1;

FIGS. 7A-7C illustrate how system software on the mobile station of FIG. 1 assigns precedence values to a precedence space according to the method of FIG. 6;

FIGS. 8A-8C illustrate the assignment and reassignment of precedence values in a manner that requires a greater number of configuration messages than would be used in the method of FIG. 6;

FIGS. 9A-9C illustrate how system software on a mobile station assigns precedence values to packet filters by dividing a total precedence space into multiple portions and reassigning precedence values into a completely unassigned portion;

FIGS. 11A-11B illustrate the placement of packet filters in a precedence space using both a first and a second embodiment of the method of FIG. 6.

DETAILED DESCRIPTION

Reference will now be made in detail to some embodiments of devices and/or processes, examples of which are illustrated in the accompanying drawings.

Figure 1:
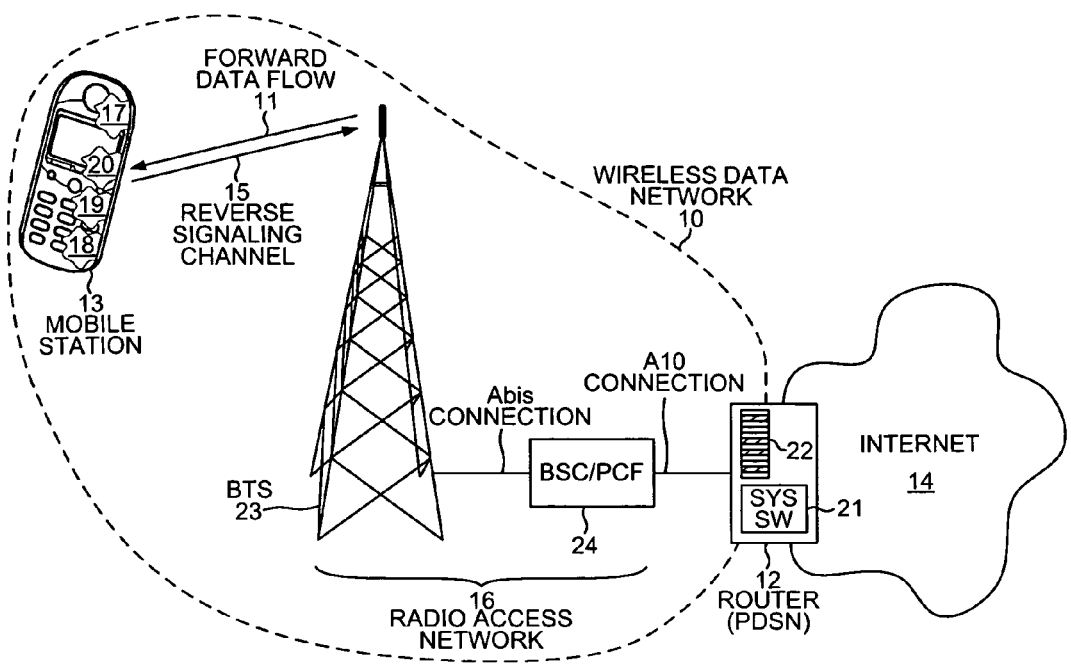
FIG. 1 is a diagram illustrating a wireless data network in which packets received from outside the network are filtered so that they can be sent to a mobile station along a communication channel with the appropriate quality of service.

FIG. 1 illustrates a wireless data network 10 that delivers data packets from a network router 12 to a mobile station 13 in a "forward" data flow 11 such that applications running on mobile station 13 have adequate levels of quality of service (QoS). Wireless data network 10 is a "data only" network in which all voice and data information is conveyed to and from mobile station 13 in packets from external IP networks, such as Internet 14. Mobile station 13 sends configuration messages to network router 12 containing filters and the priorities of those filters so that network router 12 can filter incoming IP packets into the appropriate packet data flow and send them to the associated application running on mobile station 13. The IP packets are filtered into packet data flows that exhibit the appropriate QoS required by the associated application. The configuration messages are transmitted in a "reverse" signaling channel 15 over a radio link from mobile station 13 to a radio access network (RAN) 16 and then to network router 12. The configuration messages consume valuable air interface resources. Mobile station 13 sets the priorities of the filters in such a way that in most cases the precedence values of the existing filters need not be reassigned when new filters are installed on network router 12. Moreover, when there is a conflict in the precedence value assigned to an existing and a new filter, fewer configuration messages are needed to reorder the existing filters in order to accommodate the new filter that must receive the precedence value originally assigned to an existing filter.

Finite network resources are allocated to multiple applications running on multiple mobile stations in wireless data network 10 by reserving a particular QoS for each packet flow that feeds data packets to a particular application. System software 17 and an application 18 are running on mobile station 13. Application 18 requests a particular QoS so that adequate network resources will be dedicated to application 18 to enable application 18 to operate in a well behaved manner. For example, application 18 is a voice-over-IP (VoIP) application and cannot tolerate large delays while IP packets are communicated across wireless data network 10. A streaming video application 19 and an email application 20 are also loaded on mobile station 13 but are not currently running.

In one embodiment, wireless data network 10 conforms to the 1×EV-DO standard specified as 3GPP2 C.S0024-A. Various data flows are established within wireless data network 10 that communicate internet-protocol packets between Internet 14 and mobile station 13. In the 1×EV-DO standard, a router such as network router 12 that connects wireless data network 10 to Internet 14 is called a packet data serving node (PDSN). PDSN 12 includes system software 21 and the filters 22 sent by mobile station 13. A connection exists between mobile station 13 and PDSN 12 that passes over a radio link between mobile station 13 and a base station (BTS) 23 of RAN 16, as well as over a logical Abis connection between BTS 23 and a base station controller (BSC) 24, and over a logical A10 connection between BSC 24 and PDSN 12. In this embodiment, BSC 24 is considered to include a packet control function (PCF). The data flows between Internet 14 and mobile station 13 travel over the various protocol layers defined by the 1×EV-DO standard. In this embodiment, system software 17 is the Advanced Mobile Subscriber Software (AMSS) produced by Qualcomm Incorporated. AMSS 17 includes an application programming interface (API) and a protocol stack that run on the operating system of mobile station 13. In this embodiment, mobile station 13 is a cell phone. In other embodiments, mobile station 13 is a wirelessly connected laptop computer or personal digital assistant (PDA). In other embodiments, system software 17 is the device software in the PDA or laptop computer. In yet another embodiment, system software 17 is the operating system of a cell phone that complies with the W-CDMA standard.

Figure 2:
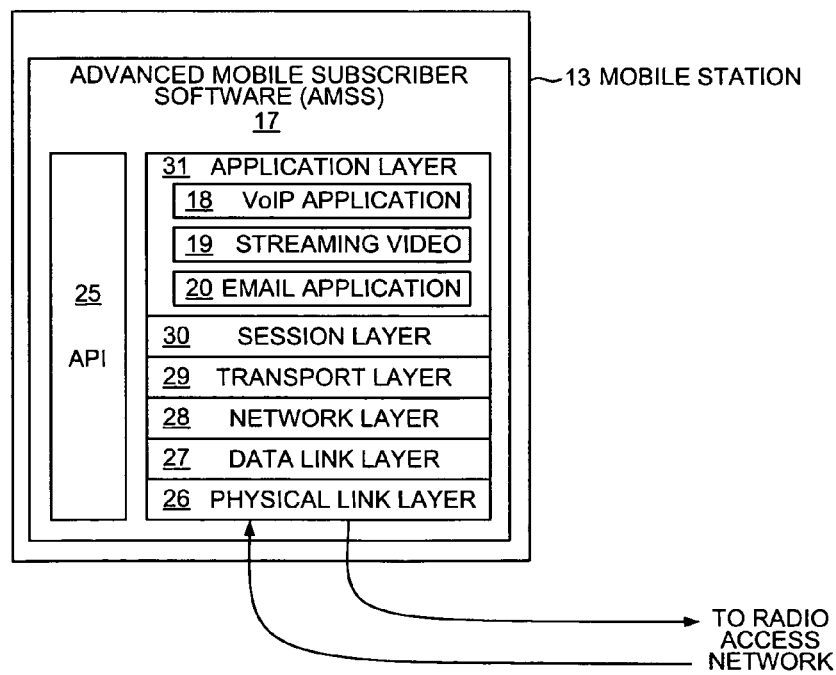
FIG. 2 is a diagram showing the system software on the mobile station of FIG. 1 in more detail.

FIG. 2 shows the protocol stack and API 25 of AMSS 17 in more detail. The protocol stack includes a physical link layer 26, a data link layer 27, a network layer 28, a transport layer 29, a session layer 30 and an application layer 31. A radio link protocol (RLP) layer is at the physical link layer 26. A reverse traffic channel medium access control (RTCMAC) layer and the point-to-point protocol (PPP) layer are at the data link layer 27. The IP layer is at the network layer 28. The transmission control protocol (TCP) layer and the user datagram protocol (UDP) layer are at the transport layer 29. Applications run at the application layer 31 of AMSS 17 and include, in this example, VoIP application 18, streaming video application 19 and email application 20.

Multiple IP flows can travel over an RLP flow, and multiple RLP flows can travel over an RTCMAC flow. The radio link protocol (RLP) provides one or more octet streams with an acceptably low erasure rate for efficient operation of higher layer protocols, such as TCP. When RLP is used as part of a multi-flow packet application (MFPA) or an enhanced multi-flow packet application (EMPA), an RLP flow carries one or more octet streams from flows at higher layers, such as IP flows. For example, VoIP application 18 uses UDP over IP over PPP over RLP, whereas file transfer applications such as e-mail application 20 employ TCP over IP over PPP over RLP.

VoIP application 18 establishes a particular QoS by establishing a "flow specification" and a "filter specification." The flow specification specifies the QoS parameters to be provided to particular flows of IP packets. Some QoS characteristics include: (i) the delay with which packets are delivered (latency), (ii) the inter-packet delay (jitter), (iii) the number of packets that are delivered per unit of time (bandwidth), and (iv) the error rate of the delivered packets. VoIP application 18 requires low latency because callers typically dislike even one second of delay between responses in a conversation. On the other hand, a high latency might be tolerable for streaming video application 19, so long as there is low jitter, i.e., little delay between packets once the first packet is delivered and the video clip starts.

Figure 3:
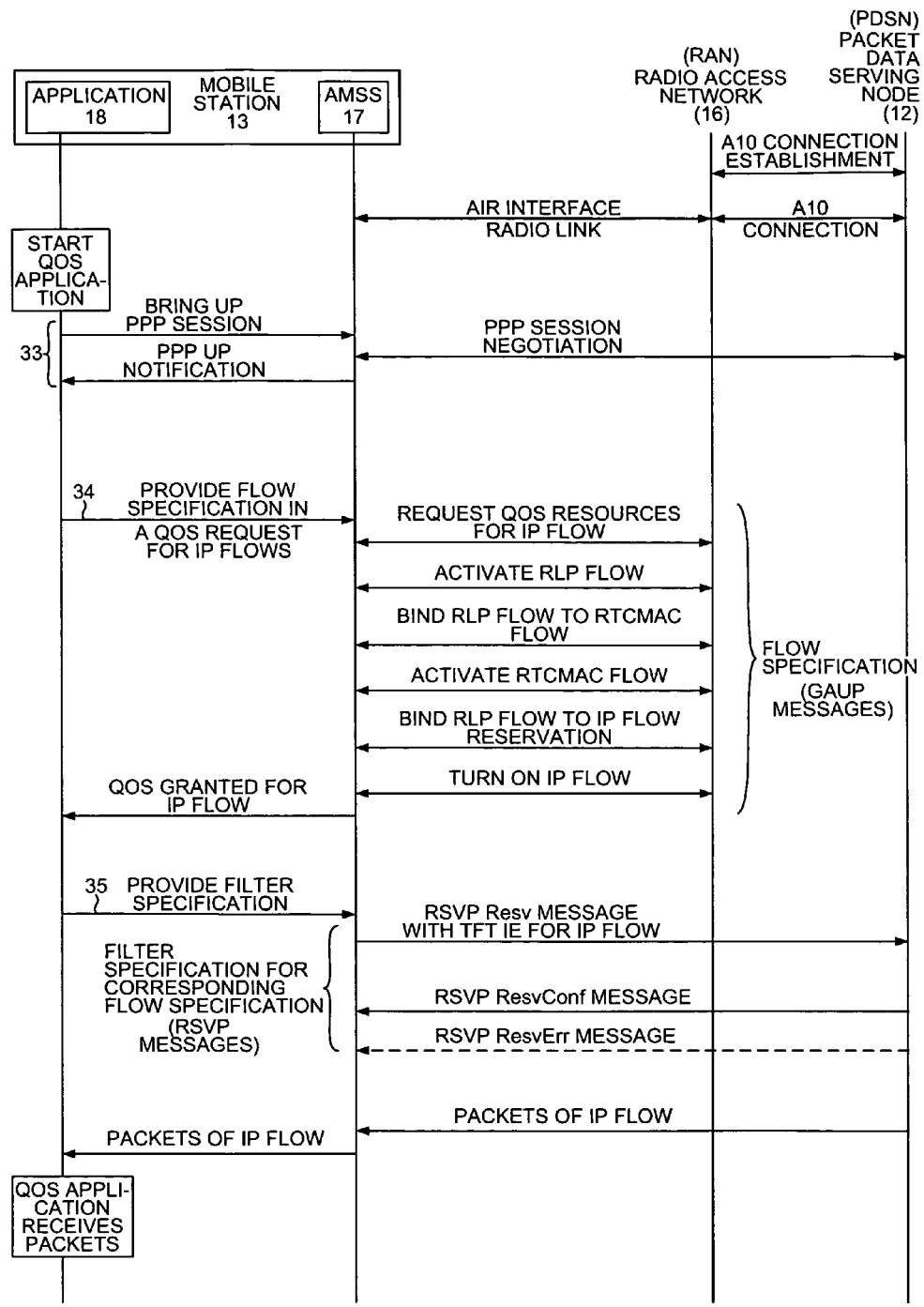
FIG. 3 is a diagram showing protocol negotiations between the mobile station and the network router of FIG. 1 for providing a flow specification and a filter specification.

FIG. 3 illustrates the process by which VoIP application 18 both reserves the network resources for the QoS parameters described in the flow specification and sets up the filter specification that maps particular IP packets to the flow specification. Before VoIP application 18 is started, RAN 16 has established an A10 connection with PDSN 12. An A10 connection is sometimes referred to as a "channel". During A10 connection establishment, RAN 16 has indicated some level of QoS for the A10 connection. The A10 connection is associated with mobile station 13 but has a QoS level that is independent of the level required by VoIP application 18. In the 1×EV-DO standard, there is one A10 connection for each air interface radio link. The A10 connection is a logical connection and is maintained by an "A10 session". A single A10 session is associated with one main A10 connection and one or more auxiliary A10 connections. A single A10 session is maintained for all the A10 connections associated with mobile station 13.

When VoIP application 18 is started and a call is made, AMSS 17 initiates negotiation of a "PPP session" with PDSN 12, as shown in FIG. 3 at 33. The PPP negotiation is carried out across the A10 connection. During these negotiations, the packet switched core of wireless data network 10 assigns one or more IP addresses to mobile station 13. A single PPP session can support multiple IP addresses but is associated with a single A10 session. VoIP application 18 provides a flow specification by requesting the required QoS parameters from AMSS 17, as shown at 34. AMSS 17 then uses generic attribute update protocol (GAUP) messages to request the appropriate QoS from RAN 16. When AMSS 17 requests a reservation of an IP flow with a particular QoS, RAN 16 dynamically assigns a reservation label to the IP flow. The reservation label is typically an 8-bit value. A particular IP flow is sometimes referred to as a "reservation".

Based on the GAUP requests for QoS, RAN 16 determines the network resources that will be required to provide the desired QoS. The network resources include not only air interface resources, but also other physical resources such as the available bandwidth between PDSN 12 and mobile station 13. RAN 16 determines the number of RLP flows and RTCMAC flows to be established and their QoS parameters. Each RLP flow and RTCMAC flow can be associated with multiple IP flows. Each IP flow is bound to an RLP flow or an RTCMAC flow with the particular physical characteristics of the applicable QoS, such as the bandwidth, the packet priority and the error rate. The RLP flows and the RTCMAC flows are then activated, and each RLP flow is bound to an RTCMAC flow. RAN 16 then binds each IP flow and its corresponding reservation label to an RLP flow. After the RLP flows and the RTCMAC flows have been activated and bound, the reserved QoS is turned on.

If the main and auxiliary A10 connections to mobile station 13 that were established before flow specification do not provide the requested QoS, then the PPP session and A10 session can be renegotiated after flow specification to establish new A10 connections. In addition, PDSN 12 may renegotiate the PPP session upon handoff from one cell of wireless data network 10 to another.

In addition to providing a flow specification, VoIP application 18 also provides a filter specification, as shown in FIG. 3 at 35. The filter specification contains one or more packet filters that allow PDSN 12 to classify incoming packets into packet data flows. Each packet data flow includes one or more IP flows and have an associated QoS as specified by the flow specification. A filter may, for example, identify IP packets by specifying ranges of values in certain fields of the headers of the packets. If the specified fields have values in the ranges specified by the filter, then the IP packet is defined to be in a packet data flow with a specified reservation label. In general, any IP or transport layer header can be among the parameters used to specify a filter. Providing the filter specification also involves mobile station 13 actually sending the specified filters to PDSN 12 along with their precedence values.

VoIP application 18 begins the process of filter specification by supplying one or more filters to the protocol processing stack of the system software AMSS 17 executing on mobile station 13. The stack of AMSS 17 then calculates the relative priorities of the filters and sends each filter along with an associated precedence value in reverse signaling channel 15 to the system software 21 of PDSN 12. The filters and precedence values are sent from mobile station 13 to PDSN 12 using the Resource Reservation Protocol (RSVP) that is described in Request for Comments (RFC) 2205 promulgated by the Internet Engineering Task Force (IETF). RSVP messages are also described by 3GPP2 in the document published as TIA-835.4-D by the Telecommunications Industry Association in the United States. RSVP protocol is used by 3GPP2 to signal filter specifications over UDP between mobile station 13 and PDSN 12.

VoIP application 18 is shown in FIG. 3 as first providing a flow specification at 34 and then providing a filter specification at 35. VoIP application 18, however, typically provides the flow specification and the filter specification simultaneously. In addition, AMSS 17 sends GAUP messages and RSVP messages to PSDN 12 in parallel.

The filters and precedence values are sent in an RSVP Resv message. Other RSVP messages include ResvConf messages and ResvErr messages. Each Resv message includes a 3GPP2 OBJECT, among other things. Each 3GPP2 OBJECT includes at least one Information Element (IE), such as a Traffic Flow Template Information Element (TFT IE). A TFT IE is defined in section B.1.1.1.1 of the TIA-835.4-D publication. A TFT IE includes one or more TFTs. There is one TFT for each IP address of mobile station 13. A TFT describes the packet filters that define the various packet data flows that are destined to a specific IP address of a mobile station. A Resv message with a TFT IE is a request to insert, modify or delete one or more packet filters from the TFT for the specific IP address.

FIG. 4 shows the format of a TFT IE in a Resv message sent from mobile station 13 to PDSN 12 that relates to traffic flowing to an IPv4 address on mobile station 13. The format of a TFT IE for an IPv6 address is similar, except that the IPv6 address occupies 128 bits in the TFT IE instead of only 32 bits. AMSS 17 generates the TFT IE and assigns the precedence values to the filters described in the TFT. The TFT IE contains TFT operation codes that instruct PDSN 12 as to which operations to perform on the corresponding TFT. For example, the operation code (opcode) 00000100 instructs PDSN 12 to replace packet filters in the existing TFT with newly received packet filters in the Resv message.

The traffic flow template contains 8-bit flow identifiers (FLOW_ID) that identify each packet data flow. Thus, the flow identifier is associated with the reservation label of the corresponding packet data flow. A TFT can contain multiple packet filters for a single flow identifier. The TFT also contains an 8-bit packet filter evaluation precedence for each filter in the TFT. The packet filter evaluation precedence specifies the priority of a packet filter in relation to all other packet filters in the TFT. The value of the evaluation precedence is in a range from zero through 255. The higher the value, the lower the precedence. A given precedence level may be used only once in a TFT, except that the value 255 may be used multiple times and indicates no precedence. Thus, for one TFT a PDSN 12 supports up to 255 (0-254) packet filters that each has a unique precedence. In addition, any number of packet filters with no specific priorities may be assigned a precedence value of 255.

In addition, the TFT IE contains "packet filter contents" for each of the filters described in the TFT. The packet filter contents includes an identification of the packet filter components used by each filter to identify the packets that are to be filtered out.

The TFT includes an 8-bit "packet filter component identifier" for each filter. The packet filter component identifiers include:

0001 0000 IPv4 source IP address with subnet mask;
0010 0000 IPv6 source IP address with prefix length;
0001 0001 IPv4 destination IP address with subnet mask;
0010 0001 IPv6 destination IP address with prefix length;
0011 0000 protocol type (IPv4) or next header (IPv6);
0100 0000 single destination port number
0100 0001 destination port range;
0101 0000 single source port number;
0101 0001 source port range;
0110 0000 IPsec Security Parameter Index (SPI);
0111 0000 type of service (ToS) (IPv4); or traffic class (IPv6);
1000 0000 flow label (IPv6);
1000 0001 routing header with prefix length; and
1000 0010 home address option with prefix length.

Returning to FIG. 3, a Resv message can contain multiple TFT IEs corresponding to multiple IP addresses on mobile station 13. PSDN 12 processes the requests in a Resv message in the order of the IEs that are present in the 3GPP2 OBJECT. If processing of all of the IEs is successful, PDSN 12 returns a ResvConf message to AMSS 17. If processing of an IE fails, PDSN 12 stops further processing of the Resv message and returns a ResvErr message to AMSS 17. If AMSS 17 receives a ResvConf message from PDSN 12, AMSS 17 assumes that all the IE data in the Resv message has been successfully processed. If AMSS 17 receives a ResvErr message from PDSN 12, AMSS 17 assumes that all of the IE data contained in the 3GPP2 OBJECT was not successfully processed.

The processing of an IE may fail and a ResvErr message will be returned to AMSS 17 for various reasons. For example, the processing of an IE will fail if PDSN 12 receives a TFT that contains a packet filter evaluation precedence (other than 255) that equals the precedence of any currently active packet filter associated with the same specific IP address. Thus, AMSS 17 generates the TFT IE and assigns the precedence values to the filters described in the TFT in such a way as to avoid conflicts between newly assigned evaluation precedences and the precedences of currently active packet filters.

Figure 5:
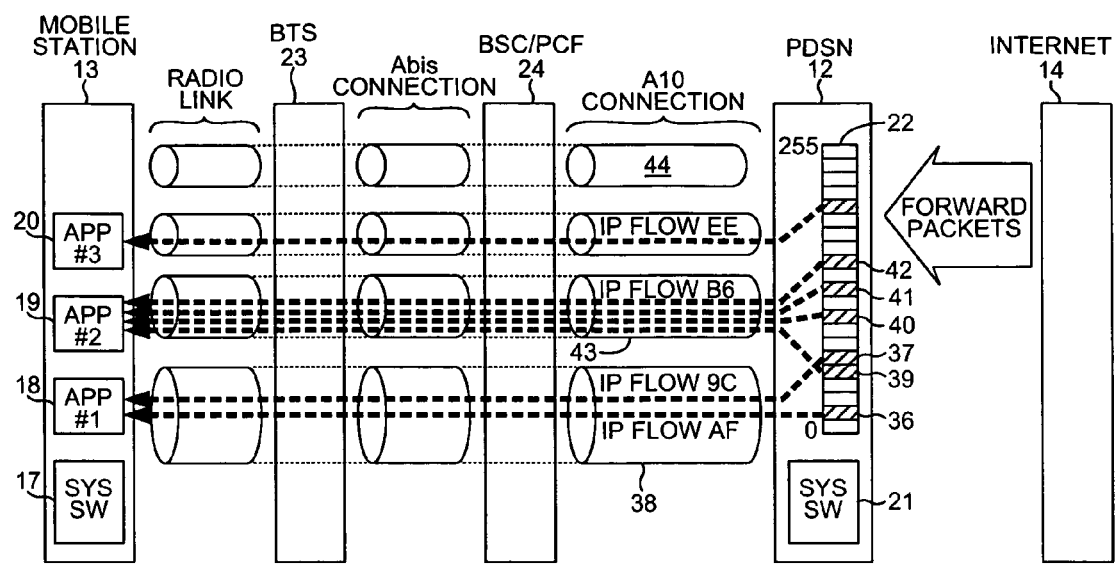
FIG. 5 is a schematic diagram showing the filters on the network router and the data flows between the network router and the mobile station of FIG. 1 in more detail.

FIG. 5 is an expanded schematic view of FIG. 1 showing the communication channels between PDSN 12 and mobile station 13 in more detail. Although packets travel along communication channels in both directions between mobile station 13 and PDSN 12, FIG. 5 illustrates only the manner in which packet filters 22 on PDSN 12 map the forward data flows from Internet 14 onto specific A10 connections (communication channels). Filters are also present on mobile station 13 and are used to map packets in the reverse direction to the communication channels with the appropriate QoS.

PDSN 12 receives the filters and precedence values from AMSS 17 in RSVP messages and then associates each filter with an A10 connection back to mobile station 13. Each filter is associated with a flow identifier that identifies a packet data flow. Each packet data flow in turn was bound during flow specification to an RLP flow and an RTCMAC flow over a specific A10 connection. PDSN 12 determines which one of multiple A10 connections will be employed to communicate data packets in the forward data flow 11 back to mobile station 13. When a packet arrives at PSDN 12 from the external IP network 14, the destination IP address of the packet is checked to determine which TFT should be applied. PSDN 12 searches for a match among all packet filters 22 in the TFT associated with the specific destination IP address. If a packet filter match is found, the packet is mapped to the packet data flow identified by the flow identifier in the EI containing the filter. The packet is then sent down the A10 connection over which the identified packet data flow flows. If an incoming forward packet does not match any packet filter of the corresponding TFT, PDSN 12 sends the IP packet down a default A10 connection.

PSDN 12 searches for a match among packet filters 22 in a particular order. Forward packets received from Internet 14 are compared first to the filter with the highest priority (lowest precedence value). If a packet matches the filter, then the packet is sent along the communication channel associated with that filter. If the incoming forward packet does not match the highest priority filter, then PDSN 12 compares the packet to the filter with the next highest priority (next lowest precedence value). If the packet matches that filter, then the packet is forwarded along the communication channel associated with that filter. The filters are therefore applied in order of their precedence values.

An application program running on mobile station 13 can associate multiple filters with one flow specification. In the example of FIG. 5, VoIP application 18 supplies two filters 36-37 to the protocol processing stack of the operating system AMSS 17. AMSS 17 then assigns precedence values to filters 36-37, sends the flow specification to RAN 16, and sends the filters and precedence values to system software 21 of PDSN 12. System software 21 uses the flow specification to identify a communication channel that is appropriate for communicating filtered packets back to VoIP application 18 and binds this channel to filters 36-37. In this example, filters 36-37 are bound to a communication channel 38 associated with a high-data-rate, low-latency RLP flow that exhibits the appropriate QoS. IP packets in the particular IP flows filtered by filters 36-37 are communicated to mobile station 13 over the high-data-rate, low-latency RLP flow. For example, packets filtered by filter 36 are communicated in IP flow AF along communication channel 38 over the A10 connection, the Abis connection and the radio link to mobile station 13.

In some situations, the filters specified by different applications for different flow specifications or even the filters specified by one application for different flow specifications are overlapping such that the same packets match multiple filters. For example, filter 36 identifies all packets whose TCP source port is 200. In this example, streaming video application 19 uses four packet filters 39, 40, 41 and 42. Filter 42 matches all packets whose TCP source port is within a range from 100 through 2000. This example illustrates that the order in which the filters are applied can determine the communication channel along which filtered packets are transmitted. A packet whose source port is 200 will be sent along the communication channel associated with whichever of filter 36 or filter 42 has the lowest precedence value. In the example of FIG. 5, filter 36 has a lower precedence value (higher priority), and a packet whose source port is 200 will be communicated in IP flow AF along communication channel 38 instead of in IP flow B6 along a different communication channel 43. Incoming packets that do not match any of the filters 22 are forwarded to mobile station 13 over a default channel 44 that does not have any QoS guarantees.

Filters for different applications may also be interleaved such that the precedence space occupied by filters of one application overlaps the precedence space occupied by filters of another application. All of the filters for one application need not have higher or lower priorities than all of the filters for another application running on the same mobile station. For example, filter 39 of streaming video application 19 has a precedence value that is lower than the precedence value of filter 37 of VoIP application 18, even though the precedence value of filter 42 of streaming video application 19 is higher than the precedence value of filter 36 of VoIP application 18. Thus, the filters of different applications need not be assigned precedence values in clusters.

Figure 6:
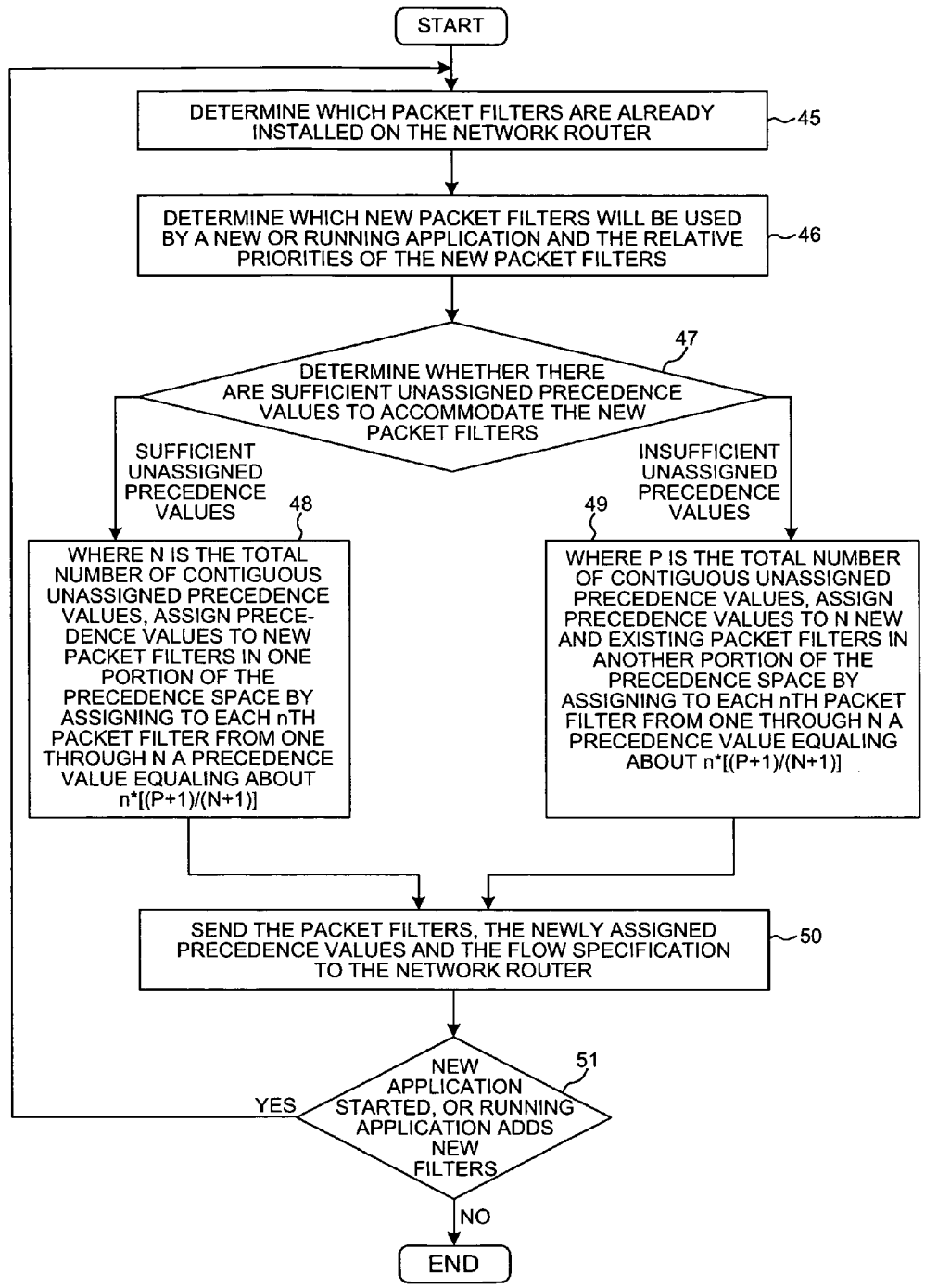
FIG. 6 is a flowchart representation of steps for assigning precedence values to packet filters so that fewer configuration messages are required to reassign precedence values when additional filters are installed on the network router of FIG. 1.

FIG. 6 is a flowchart representation of steps of a novel method of assigning precedence values to packet filters so that fewer configuration messages are required to reassign precedence values when either the existing running application or an additional new application on mobile station 13 installs new filters in network router 12. In the embodiment of FIG. 1, the precedence values are assigned by AMSS 17 and installed on PDSN 12.

In a first step 45, AMSS 17 determines which packet filters are already installed on PDSN 12 and determines the precedence values that were assigned to those existing filters. In a step 46, a new application is started, and AMSS 17 determines which filters are to be used by the new application. Alternatively, AMSS 17 determines which new additional filters are to be used by the existing running application. AMSS 17 also determines the relative priorities of the new packet filters. In a step 47, AMSS 17 divides the total precedence space into portions and determines whether there are sufficient unassigned precedence values in an unassigned precedence space within one of the portions to accommodate the filters that are to be used by the new application. In this example, no packet filters have yet been assigned anywhere in the total precedence space.

In steps 48 and 49, AMSS 17 assigns all precedence values into one of the portions of the total precedence space. AMSS 17 assigns a "packet filter evaluation precedence" to each of the new filters that are to be used by the new application and in so doing maintains the relative priorities indicated by the application. Alternatively, AMSS 17 assigns a precedence value with the correct priority to each additional filter that is to be used by the running application. In step 48, if AMSS 17 determines from step 47 that there are sufficient unassigned precedence values in one portion to accommodate the new filters and any existing filters, then AMSS 17 assigns precedence values in that portion to all of the new filters. In step 49, if AMSS 17 determines from step 47 that there are insufficient unassigned precedence values in the first portion to accommodate the new and existing filters, then AMSS 17 assigns precedence values to all of the new and existing filters in another portion of the total precedence space. Where there are P contiguous unassigned precedence values in a portion of the precedence space, in a first embodiment, AMSS 17 assigns N filters to the unassigned precedence space such that there are approximately one fewer than $(P+1)/(N+1)$ unassigned precedence values on either side of each precedence value that AMSS 17 assigns to each new or existing filter. In a second embodiment, AMSS 17 assigns to each $n^{th}$ packet filter from one through N a precedence value equaling approximately $n*[(P+1)/(N+1)]$. The resulting value is rounded up or down to the nearest integer for both the gap size in the first embodiment and filter position in the second embodiment.

In a step 50, AMSS 17 sends the packet filters, the newly assigned precedence values and the other filter specifications for each flow specification to system software 21 of PDSN 12 in a TFT IE of an RSVP Resv message.

In a step 51, AMSS 17 determines whether a new application has been started on mobile station 13 or whether a running application is adding additional filters. If a new application has started or a running application is adding additional filters, AMSS 17 returns to step 45 of the method for assigning precedence values.

FIGS. 7A-7C illustrate how AMSS 17 assigns precedence values according to the first embodiment of the method of FIG. 6. In this example, AMSS 17 determines in step 45 that no packet filters have yet been installed in the precedence space on PDSN 12. In step 46, VoIP application 18 is turned on and provides a flow specification and a filter specification to AMSS 17. As part of the filter specification, VoIP application 18 supplies filters 36-37 to AMSS 17. AMSS 17 assigns the relative priorities of the filters and indicates that filter 36 has a higher priority than filter 37.

In step 47, AMSS 17 divides a total precedence space of 2*P precedence values into two equal portions, one having a range from zero through P−1, and the other having a range from P through (2*P)−1. In the example shown in FIGS. 7A-7C, 2*P is sixteen. AMSS 17 determines that there are sufficient unassigned precedence values in an unassigned precedence space to accommodate the two new filters 36-37 that are to be used by VoIP application 18. In this iteration of step 47, AMSS 17 considers the unassigned precedence space to be the first portion of the space from zero through P−1. In other iterations of step 47 where filters have already been assigned to a portion of the total precedence space, AMSS 17 considers the unassigned precedence space to be the total number of contiguous unassigned precedence values in the space where new filters are to be assigned. Because AMSS 17 determines that there are sufficient unassigned precedence values, AMSS 17 proceeds to step 48 instead of to step 49.

In step 48, AMSS 17 assigns precedence values to the two filters 36-37 in the first portion of the total precedence space from zero through P−1. When assigning the precedence values, AMSS 17 maintains the relative priorities of the filters 36-37 by assigning a higher priority (lower precedence value) to filter 36 than to filter 37. AMSS 17 assigns precedence values to filters 36-37 in the portion of the total precedence space having the range zero through seven. AMSS 17 assigns precedence values to filters 36-37 such that there are approximately one fewer than (P+1)/(N+1) unassigned precedence values on either side of the evaluation precedence for filter 36 and for filter 37. In this example, N is two, the number of newly added filters, and P is eight. Thus, AMSS 17 assigns precedence values to filters 36-37 such that there are two [(9/3)−1] unassigned precedence values on either side of filter 36 and filter 37. Consequently, filter 36 is assigned a precedence value of two, and filter 37 is assigned a precedence value of five.

In step 50, AMSS 17 sends the flow specification to RAN 16, and sends the filters 36-37 and the precedence values (two and five) to system software 21 of PDSN 12. FIG. 7A shows the precedence values that have been assigned to filters 36-37 in the precedence space on PDSN 12 after VoIP application 18 has been started.

In step 51, AMSS 17 determines that streaming video application 19 has been started on mobile station 13, and AMSS 17 returns to step 45.

When AMSS 17 performs step 45 a second time, AMSS 17 determines that filters 36-37 have been installed on PDSN 12 with precedence values two and five. In step 46, streaming video application 19 provides a flow specification and a filter specification to AMSS 17. As part of the filter specification, streaming video application 19 supplies four filters 39, 40, 41 and 42 to AMSS 17. AMSS 17 then determines the relative priorities of the filters. In addition, AMSS 17 determines that filter 39 for streaming video application 19 must have a higher relative priority than filter 37 for VoIP application 18, while filters 40-42 must have a lower priority than filter 37.

In step 47, AMSS 17 determines that there are insufficient unassigned precedence values in an unassigned precedence space to accommodate the four filters 39, 40, 41 and 42 that are to be used by streaming video application 19. When AMSS 17 performs step 47 a second time, the relevant unassigned precedence space is the total number of contiguous unassigned precedence values around the existing filters 36-37. AMSS 17 determines that there are insufficient unassigned precedence values in the first portion of the total precedence space necessary to assign the three filters 40, 41 and 42 with precedence values higher than the precedence value five assigned to filter 37. In other words, although three new filters are to be added to PDSN 12 with priorities lower than that of filter 37, there are only two unassigned precedence values in the range of precedence values from zero to seven that have priorities lower than the precedence value of filter 37. FIG. 7B illustrates that there are insufficient unassigned precedence values in the first portion of the precedence space for the three filters 40, 41 and 42 to be assigned precedence values higher than that of filter 37.

Because AMSS 17 determines in this iteration of step 47 that there are insufficient unassigned precedence values, AMSS 17 proceeds to step 49 instead of to step 48.

In step 49, AMSS 17 assigns precedence values to all of the new and existing filters in another portion of the total precedence space. In this case, AMSS 17 assigns the precedence values in a second portion of the total precedence space having a range from P through (2*P)−1 (from eight through fifteen). In this second portion, there are eight contiguous unassigned precedence values. AMSS 17 assigns six filters to the unassigned precedence space such that there are approximately one fewer than (P+1)/(N+1) precedence values on either side of each precedence value that AMSS 17 assigns to each new or existing filter. In this example, P is eight and N is six. Thus, AMSS 17 assigns precedence values to filters 36, 39, 37, 40, 41 and 42 such that there are approximately 0.29 [(9/7)−1] unassigned precedence values on either side of each of the six filters. In one implementation of the first embodiment, AMSS 17 rounds to the nearest integer value when assigning precedence values beginning with the filter having the highest priority. Thus, 0.29 is rounded to zero, and no unassigned precedence values separate the six new and existing filters. FIG. 7C shows how AMSS 17 has assigned precedence values to the six filters 36-37 and 39-42 in the second portion of the total precedence space. In another implementation, one of the two remaining unassigned precedence values is assigned a priority higher than filter 36, and the other unassigned precedence value is assigned a priority lower than filter 42.

In step 50, AMSS 17 sends the flow specification to RAN 16 and sends the six filters and the six newly assigned precedence values to PDSN 12. This involves resending the existing filters 36-37 along with the new filters 40-42 in a new TFT IE of an additional RSVP Resv message. In step 51, AMSS 17 determines that no new application has been started.

FIGS. 8A-8C illustrate a situation in which the number of configuration messages required to reassign precedence values is greater than the number that would be used to reassign precedence values using the method of FIG. 6. The situation illustrated in FIGS. 8A-8C occurs in a network that conforms to the W-CDMA standard. Where wireless data network 10 is a W-CDMA or GPRS network, network router 12 is called a GPRS gateway serving node (GGSN) router. The 3GPP (3rd Generation Partnership Project) standards body has defined protocols such as 3GPP TS 24.008 for specifying filters and precedence values for W-CDMA and GPRS networks. Sub-clause 10.5.6.12 of the 3GPP TS 24.008 v.6.9.0 technical specification describes the format of the traffic flow template information element (TFT IE) used in W-CDMA networks. In the W-CDMA standard, TFTs containing packet filters and precedence values are sent to GGSNs in configuration messages called GPRS Session Management Messages. A configuration message can contain filters from no more than one application. Thus, multiple configuration messages are required to assign and reassign precedence values to filters from multiple applications.

FIG. 8A shows an example of the precedence values assigned to the filters of two running applications. The precedence values are not assigned using the method of FIG. 6, but rather are assigned in a contiguous block. Assigning precedence values contiguously increased the probability that there will be insufficient unassigned precedence values when a new filter has a priority between two existing filters. Indeed, when all existing filters have been assigned contiguous precedence values, there is a 100% probability that a conflict in precedence values will occur when a new filter is inserted between two existing filters. Consequently, the number of configuration messages required to reassign precedence values to the new and existing filters is more than would be required using the method of FIG. 6. Here, a minimum of three configuration messages are necessary to assign and reassign precedence values to the filters for the two running applications and for one new application. In FIG. 8B, precedence values are not reassigned into an unassigned precedence space according to step 49 of the method of FIG. 6. This also results in more configuration messages being required to reassign precedence values than would be required using the method of FIG. 6.

In FIG. 8A, a total of five precedence values have been assigned to three filters (A1, A2 and A3) of a first running application and to two filters (B1 and B2) of a second running application. FIG. 8B illustrates the number of configuration messages that are used to reassign precedence values when a new application starts on mobile station 13 and installs two new filters (C1 and C2) in network router 12. System software 17 on mobile station 13 determines that filter C1 has a higher priority than filter A1 and that filter C2 has a priority between that of filters B1 and A2.

In the W-CDMA standard, one signaling message is used to assign precedence values to the filters mapped to the same flow identifier and QoS. Typically, all of the filters used by a single application on mobile station 13 will map packets to the same IP flow because those packets are to receive the same QoS. Thus, a single W-CDMA signaling message cannot be used in FIG. 8B to reassign the precedence values of a filter for the first application as well as a filter for the second application. As under the 1×EV-DO standard, a W-CDMA signaling message may also not assign a precedence value to a filter if the precedence value has already been assigned to an existing filter. Therefore, one signaling message must be sent to GGSN 12 to assign a new precedence value to an existing filter before another signaling message may reassign the old precedence value to a new filter. Where a new filter is assigned a precedence value in the middle of a contiguous block of assigned precedence values, the precedence value for the new filter must be freed up by reassigning precedence values to the existing filters in a cascading manner. For example, in FIG. 8B one signaling message frees up precedence value four by reassigning existing filter B2 a precedence value of six. Only then can a subsequent signaling message reassign existing filter A2 the precedence value of four. Seven configuration messages are used in the manner shown in FIG. 8B to assign and reassign precedence values to the new and existing filters, which is much more than the minimum number of three configuration messages required to reassign filter precedences for three applications.

FIG. 8C shows the precedence values assigned to the two new and five existing filters of the three applications after the seven signaling messages have assigned and reassigned precedence values to the new and existing filters in the manner shown in FIG. 8B.

FIGS. 9A-9C illustrate an improved method of assigning precedence values to the seven filters shown in FIG. 8C. By dividing the total precedence space into multiple portions and reassigning precedence values into the completely unassigned portion according to step 49, precedence values with the correct priorities can be assigned to both new and existing filters using fewer W-CDMA signaling messages than used in FIGS. 8A-8C.

FIG. 9A shows that the total precedence space of sixteen precedence values has been divided into two portions: a first portion with precedence values in a range from zero through seven, and a second portion with precedence values in a range from eight through fifteen. No precedence values are assigned in the second portion. A first signaling message reassigns precedence values in the second portion to the three filters (A1, A2 and A3) of the first running application. A second signaling message reassigns precedence values in the second portion to the two filters (B1 and B2) of a second running application.

FIG. 9B shows that a third signaling message assigns precedence values in the second portion to the two filters (C1 and C2) of the new application.

FIG. 9C shows the precedence values assigned to the two new and five existing filters of the three applications after the three signaling messages have assigned and reassigned precedence values into a completely unassigned portion according to step 49 of the method of FIG. 6. The first portion of the precedence space is now completely unassigned. An eighth filter with a priority between those of the existing filters could now be assigned a precedence value using fewer signaling messages than required with the cascading method by reassigning precedence values into the first portion of the precedence space.

Fewer configuration messages are also needed in 1×EV-DO networks to assign precedence values if the total precedence space is divided into multiple portions and precedence values are reassigned into a completely unassigned portion of the precedence space according to step 49. Although under the 1×EV-DO standard one TFT in one Resv message may contain multiple packet filters for each of multiple flow identifiers, the cascading method of reassigning precedence values in a contiguous block may nevertheless not be possible with one or just a few RSVP Resv messages. RSVP messages that contain a large number of filters may be fragmented in the transmission from mobile station 13 to PDSN 12. If one of the fragments of the large RSVP message is lost, the fragmented RSVP messages cannot be processed, and the entire RSVP message must be retransmitted. Retransmitting RSVP messages consumes air interface resources. To avoid the need to retransmit entire RSVP messages for which a fragment has been lost, a few smaller RSVP messages are sent according to the method of FIG. 6. Thus, when many filters are sent to PDSN 12, the filters, precedence values and flow specification are divided among a few RSVP messages. If a fragment of a smaller RSVP message is lost, only the smaller RSVP message must be retransmitted.

In addition, even where a single Resv message is used to assign precedence values in a 1×EV-DO network, applying the method of FIG. 6 also has the advantage of reducing the complexity in the order by which precedence values must be assigned and reassigned by the single Resv message. For example, a filter cannot be assigned to a precedence until another filter that occupies that precedence space is reassigned a new precedence value. Where assigned precedence values are spread out according to the method of FIG. 6, the probability of a conflict is reduced, as is the need to perform a cascading reassignment of precedence values even where such a cascading reassignment could be performed using a single Resv message. The implementation of AMSS 17 is simplified by reducing the complexity in the order by which precedence values must be assigned and reassigned to various filters.

Figure 10:
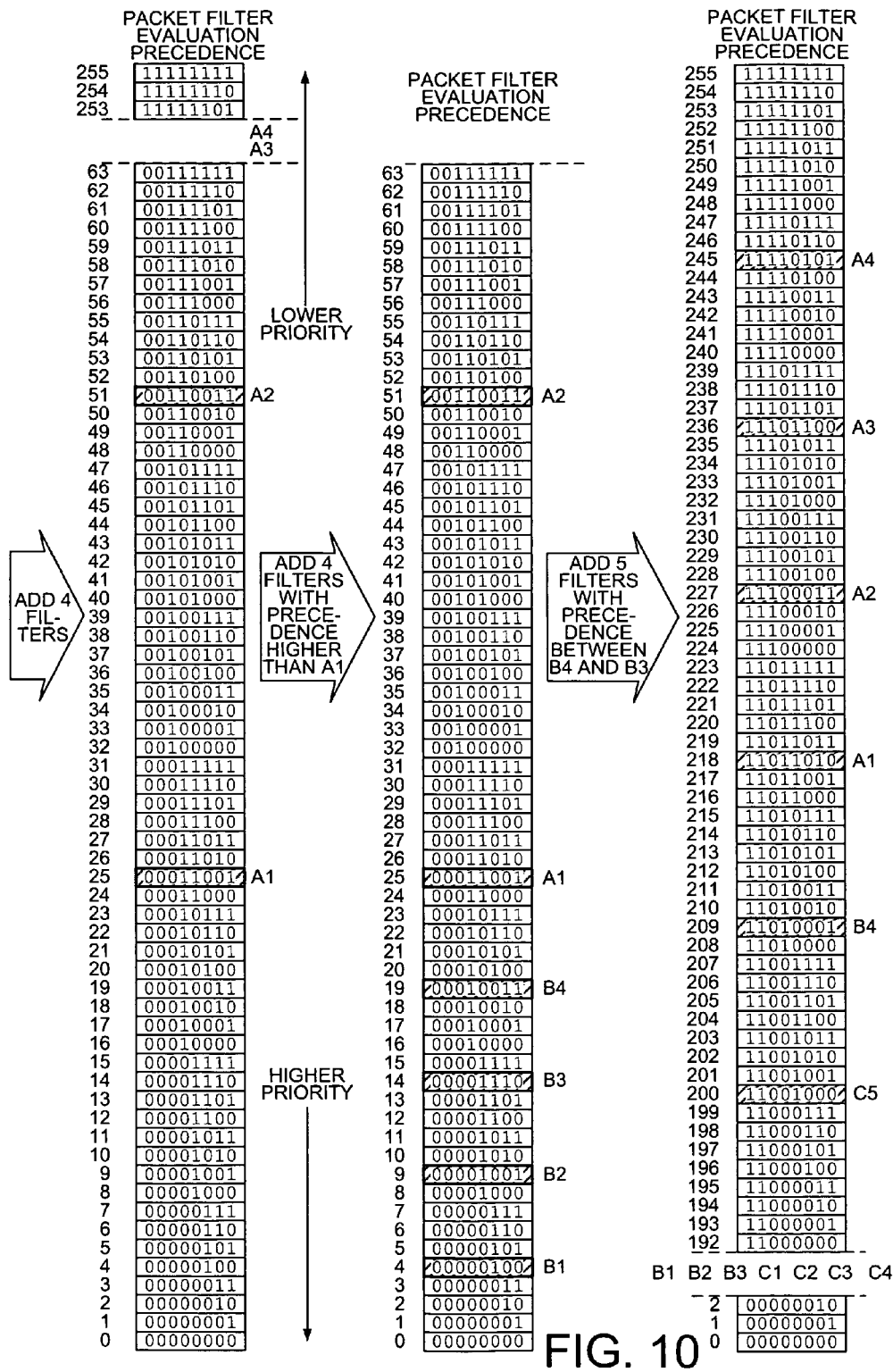
FIG. 10 is a diagram showing a precedence space that has been divided into multiple portions, where precedence values are reassigned into a previously unassigned portion according to the method of FIG. 6.

FIG. 10 illustrates another example of dividing the total precedence space into multiple portions and reassigning precedence values into the completely unassigned portion according to the method of FIG. 6. In this example, precedence values are assigned using RSVP Resv messages in a 1×EV-DO network.

In step 45, AMSS 17 determines that no packet filters have yet been installed on PDSN 12. PDSN 12 has a total precedence space of 2*P 8-bit values, where P equals 128. Thus, the highest priority precedence value is 00000000, and the lowest priority precedence value is 11111111. In step 46, VoIP application 18 is turned on and provides a flow specification and a filter specification to AMSS 17. As part of the filter specification, VoIP application 18 supplies four filters (A1-A4) to AMSS 17. AMSS 17 then assigns the relative priorities of the filters.

In step 47, AMSS 17 divides the total precedence space of 2*P precedence values into two equal portions, one having a range from zero through P−1, and the other having a range from P through (2*P)−1. As no packet filters have yet been installed, AMSS 17 determines that there are sufficient unassigned precedence values in the first portion of the space from zero through 127 to accommodate the four new filters used by VoIP application 18. Because AMSS 17 determines that there are sufficient unassigned precedence values, AMSS 17 proceeds to step 48 instead of to step 49.

In step 48, AMSS 17 assigns precedence values to the four filters A1-A4 in the first portion of the total precedence space from zero through 127. AMSS 17 assigns precedence values to filters A1-A4 such that there are approximately one fewer than (P+1)/(N+1) unassigned precedence values on either side of the precedence values for each of filters A1-A4. In this example, P is 128 and N is four, so AMSS 17 assigns precedence values such that there are approximately 24.8 [(129/5)−1] unassigned precedence values on either side of each filter. In this implementation of AMSS 17, 24.8 is rounded to twenty-five, and filters A1-A4 are assigned precedence values of 25, 51, 77 and 103, respectively. There are only twenty-four unassigned precedence values in the first portion with a priority lower than that of filter A4.

In step 50, AMSS 17 sends the filters A1-A4, the corresponding precedence values and the flow specification to PDSN 12. In step 51, AMSS 17 determines that streaming video application 19 has been started on mobile station 13, and AMSS 17 returns to step 45.

When AMSS 17 performs step 45 a second time, AMSS 17 determines that filters A1-A4 have been installed on PDSN 12 with precedence values 25, 51, 77 and 103, respectively. In step 46, streaming video application 19 supplies four filters B1-B4 to AMSS 17 and indicates the relative priorities of the filters. In addition, AMSS 17 determines that all four filters for streaming video application 19 must have a higher relative priority than filter A1 for VoIP application 18.

When AMSS 17 performs step 47 a second time, the relevant unassigned precedence space is the total number of contiguous unassigned precedence values with priorities higher than that of filter A1. In step 47, AMSS 17 determines that there are sufficient unassigned precedence values in the unassigned precedence space from zero through twenty-four to accommodate the four filters B1-B4 that are to be used by streaming video application 19. Because AMSS 17 determines in this iteration of step 47 that there are sufficient unassigned precedence values, AMSS 17 proceeds to step 48 instead of to step 49.

In step 48, AMSS 17 assigns precedence values to the new filters in the unassigned precedence space in the first portion of the total precedence space. In this iteration of step 48, P is the total number of contiguous precedence values in the unassigned precedence space. AMSS 17 assigns precedence values to filters B1-B4 such that there are approximately one fewer than (P+1)/(N+1) unassigned precedence values on either side of the precedence values for each of filters B1-B4. In this iteration of step 48, P is twenty-five and N is four, so AMSS 17 assigns precedence values such that there are approximately 4.2 [(26/5)−1] unassigned precedence values on either side of each filter. In this implementation of AMSS 17, 4.2 is rounded to four, and filters B1-B4 are assigned precedence values of 4 (00000100), 9 (00001001), 14 (0001110) and 19 (00010011), respectively. Note that there are five instead of four unassigned precedence values between filter B4 and filter A1 in this implementation.

In step 50, AMSS 17 sends the four filters, the four newly assigned precedence values and the corresponding flow specification to PDSN 12. In step 51, AMSS 17 determines that email application 20 has been started on mobile station 13, and AMSS 17 returns to step 45.

When AMSS 17 performs step 45 a third time, AMSS 17 determines that filters A1-A4 and B1-B4 have been installed on PDSN 12. In step 46, email application 20 supplies five filters C1-C5 to AMSS 17, and AMSS 17 indicates the relative priorities of the filters. In addition, AMSS 17 determines that all five filters for email application 20 must have priorities higher than that of filter B4 and lower than that of filter B3.

When AMSS 17 performs step 47 a third time, the relevant unassigned precedence space is the total number of contiguous unassigned precedence values with priorities between those of filters B4 and B3. In step 47, AMSS 17 determines that there are insufficient unassigned precedence values in the unassigned precedence space between filters B4 and B3 to accommodate the five filters C1-C5 that are to be used by email application 20. In other words, the four unassigned precedence values fifteen through eighteen are insufficient for the five filters C1-C5. Because AMSS 17 determines in this iteration of step 47 that there are insufficient unassigned precedence values, AMSS 17 proceeds to step 49 instead of to step 48.

In step 49, AMSS 17 assigns precedence values to all of the new and existing filters in the second portion of the total precedence space from 128 through 255. AMSS 17 assigns a total of thirteen filters to the unassigned precedence space from 128 through 255 such that there are approximately one fewer than (P+1)/(N+1) precedence values on either side of each precedence value assigned to each new or existing filter.

Thus, AMSS 17 assigns precedence values to the thirteen new and existing filters such that there are approximately 8.2 [(129/14)−1] unassigned precedence values on either side of each of the thirteen filters. In one implementation, 8.2 is rounded to eight, and AMSS 17 assigns the precedence values 137, 146, 155, 164, 173, 182, 191, 200, 209, 218, 227, 236 and 245 to the filters B1, B2, B3, C1, C2, C3, C4, C5, B4, A1, A2, A3 and A4, respectively. Thus, AMSS 17 assigns the precedence values 128+(n*9) to the thirteen filters, where n is the rank of the priority of each of the filters. FIG. 10 shows the precedence values assigned to the filters C5, B4, A1, A2, A3 and A4 in a part of the second portion of the total precedence space. Note that there are nine unassigned precedence values between filter B1 and the beginning of the second portion of the total precedence space, and ten unassigned precedence values between filter A4 and the end of the second portion of the total precedence space. In another implementation, there would be eight unassigned precedence values between filter B1 and the beginning of the second portion of the total precedence space, and eleven unassigned precedence values between filter A4 and the end of the second portion of the total precedence space.

In step 50, AMSS 17 sends the thirteen filters, the thirteen newly assigned precedence values and the flow specification to PDSN. 12. In step 51, AMSS 17 determines that no new application has been started and does not repeat step 45.

FIGS. 11A-11B illustrate a situation in which the second embodiment of the method of FIG. 6 results in a placement of filters that is more spread out than the placement obtained using the first embodiment. Where the number of filters to be installed in an unassigned precedence space approaches the number of precedence values in the precedence space, the rounding down of the gap size calculated by the first embodiment of the method of FIG. 6 results in a gap size of zero spaces and thus in a contiguous block of filters. Subsequent installation of filters into the contiguous block of existing filters will result in a conflict. There is a higher probability that a subsequent conflict can be avoided by using the second embodiment when the number of filters to be installed approaches the number of unassigned precedence spaces. The second embodiment rounds the calculated result of each filter position instead of repeatedly applying the rounding error in the gap size as occurs in the first embodiment.

FIG. 11A shows the precedence values assigned by AMSS 17 to N filters in an unassigned precedence space of P spaces. In this example, P is 24 and N is 16. AMSS 17 assigns to each nth packet filter from one through fifteen a precedence value equaling approximately $n*[(P+1)/(N+1)]$. The resulting precedence value indicates the filter position and is rounded up or down to the nearest integer. For example, the fifteenth filter is assigned a precedence value of twenty-two, which is obtained by rounding down 22.06 $[15*(24+1)/(16+1)]$. FIG. 11B shows the precedence values that would be obtained by using the first embodiment of FIG. 6. The first embodiment calculates the gap size, which is approximately one fewer than $(P+1)/(N+1)$. In this example, the gap size is 0.47, which is rounded down to zero. The gap size of zero is approximately one fewer than $(24+1)/(16+1)$. Repeatedly applying a rounded down gap size of zero results in a contiguous block of sixteen filters, which is less spread out than the distribution of precedence values obtained using the second embodiment.

By spreading out the precedence values assigned to the packet filters using the method of FIG. 6, the probability is decreased that there will be insufficient unassigned precedence values when a precedence value is assigned to a new filter used by another application. In addition to reducing the probability that a conflict will occur, when a conflict does occur, the method of FIG. 6 allows fewer configuration messages to be used to assign a precedence value to the new filter and to reassign precedence values to existing filters. The method of FIG. 6 reassigns the precedence values to a second unassigned portion of the total precedence space when there are insufficient unassigned precedence values for the filters of a new application in a first portion of the total precedence space. In yet another embodiment, the precedence values are realigned in a first unassigned portion of the total precedence space when the mobile station in a 1×EV-DO network is handed off from one PDSN to another. At handoff, a mobile station again signals to the PDSN the TFTs associated with all of the IP flows towards the mobile station. Reassigning precedence values upon a PDSN handoff uses the RSVP messages that would be transmitted in any event. Both the first and second portions of the precedence space in the new PDSN are unassigned at handoff. And by spreading out the precedence values in the first portion of the precedence space, the probability is decreased that the assignment of additional precedence values will require multiple RSVP messages.

Although certain specific embodiments are described above for instructional purposes, the teachings of this patent document have general applicability and are not limited to the specific embodiments described above. For example, a method of assigning precedence values to packet filters has been described with regard to configuration messages that conform to the CDMA 1×EV-DO standard. The method of assigning precedence values to packet filters so that fewer configuration messages are required to reassign precedence values when new filters are installed on a network router also sees application in mobile stations that conform to other standards. For example, the method is equally applicable to the cdma2000 1× standard. The method can also be used with mobile stations that conform to the UMTS standard and to the General Packet Radio Service (GPRS) standard based on the Global System for Mobile communications (GSM). The method for assigning and reassigning precedence values described above first spreads out precedence values in a first portion of a precedence space having higher priority precedence values and then assigns precedence values for new and existing packet filters into a previously unassigned second portion of the precedence space having lower priority precedence values. The method may also be practiced by first spreading out precedence values in a portion of the precedence space having lower priority precedence values and then reassigning precedence values for new and existing packet filters in a portion of the precedence space having higher priority precedence values. The precedence space may also be dividing into more than two portions.

The previous description of the disclosed embodiments is provided to enable any person skilled in the art to make or use the present invention. Various modifications, adaptations, and combinations of the various features of the described specific embodiments can be practiced without departing from the scope of the claims that are set forth below. Accordingly, the claims are to be accorded the widest scope consistent with the principles and novel features disclosed herein.

What is claimed is:

1. A method for assigning precedence values to packet filters of applications running on a mobile station in a wireless network, comprising:
   (a) dividing a precedence space into a first portion and a second portion by the mobile station, wherein the second portion is completely unassigned;
   (b) assigning precedence values to a first group of packet filters by the mobile station, wherein the precedence values for the first group of packet filters are spread out within the first portion of the precedence space; and
   (c) assigning precedence values to a second group of packets filters and reassigning the precedence values for the first group of packets filters by the mobile station, wherein the precedence values for the second group of packet filters and the precedence values for the first group of packet filters are spread out within the second portion of the precedence space that was previously completely unassigned.

2. The method of claim 1, wherein there are a number of packet filters in the first group of packet filters and the second group of packets filters, wherein there are a number of contiguous unassigned precedence spaces in the second portion of the precedence space, and wherein the precedence values are spread out in (c) based on the number of contiguous unassigned precedence spaces and on the number of packet filters in the first group of packet filters and the second group of packets filters.

3. The method of claim 1, wherein the precedence values are assigned in (c) when the mobile station is handed off from one network router to another network router.

4. The method of claim 1, further comprising, after (b) and before (c):
(d) communicating the first group of packet filters to a network router by the mobile station.

5. The method of claim 4, wherein the network router is a packet data serving node (PDSN).

6. The method of claim 4, wherein the network router is a GPRS Gateway Serving Node (GGSN).

7. The method of claim 1, wherein a network router receives incoming data packets and compares the incoming data packets to the first group of packet filters and to the second group of packet filters, wherein the precedence values assigned to the packet filters have an order, and wherein the incoming data packets are compared to the packet filters in the order of the precedence values assigned to the packet filters.

8. The method of claim 1, wherein data packets are compared to packet filters of the first group of packet filters and of the second group of packet filters, wherein each packet filter of the first group of packet filters and of the second group of packet filters has a priority, and wherein the data packets are compared to the packet filters according to the priority of the packet filters.

9. The method of claim 8, wherein the precedence values are assigned in (c) when there are insufficient unassigned precedence values in the first portion of the precedence space to accommodate both the first group of packet filters and the second group of packet filters while maintaining the priority of the packet filters.

10. A method of assigning precedence values to packet filters, comprising:
(a) assigning a precedence value to each of N packet filters, wherein each precedence value assigned to each of the N packet filters falls within a currently unassigned precedence space, wherein the currently unassigned precedence space has P values and has a range from one through P, and wherein the precedence value assigned to each $n^{th}$ packet filter from one through N has a value approximately equaling $n*[(P+1)/(N+1)]$; and
(b) communicating the N packet filters from a mobile station to a network router.

11. The method of claim 10, further comprising:
(c) communicating the corresponding precedence value for each of the N packet filters from the mobile station to the network router.

12. The method of claim 10, wherein a total precedence space has 2*P values and has a range from one through 2*P, and wherein no packet filter is assigned a precedence value that falls within a range from P+1 through 2*P.

13. The method of claim 10, wherein a first of the N packet filters is mapped to a communication channel from the network router to the mobile station, wherein the communication channel has an associated quality of service (QoS), wherein the network router determines whether a data packet matches the first of the N packet filters, and if the data packet matches the first of the N packet filters then the data packet is communicated across the communication channel to the mobile station.

14. The method of claim 10, wherein a total precedence space has 2*P values, further comprising:

(c) assigning a new precedence value to each of the N packet filters, wherein each of the new precedence values assigned to each of the N packet filters falls within a reserved precedence space, wherein the reserved precedence space has P values that fall within a range from P+1 through 2*P.

15. The method of claim 14, further comprising:
(d) assigning a precedence value to each of F packet filters, wherein each precedence value assigned to each of the F packet filters falls within the reserved precedence space, and wherein the precedence value assigned to each $n^{th}$ packet filter from one through N+F in the reserved precedence space has a value approximately equaling $P+[n*(P+1)/(N+F+1)]$.

16. The method of claim 15, further comprising:
(e) communicating the F packet filters from the mobile station to the network router.

17. The method of claim 10, wherein the N packet filters are communicated in (b) from the mobile station to the network router in an RSVP Resv message.

18. The method of claim 10, wherein the network router is a packet data serving node (PDSN).

19. The method of claim 10, wherein the N packet filters are communicated in (b) from the mobile station to the network router in a GPRS Session Management Message.

20. The method of claim 10, wherein the network router is a GPRS Gateway Serving Node (GGSN).

21. A method of assigning precedence values to packet filters, comprising:
(a) assigning a precedence value to each of N packet filters, wherein each precedence value assigned to each of the N packet filters falls within a currently unassigned precedence space, wherein the currently unassigned precedence space has P values, and wherein there are approximately one less than (P+1)/(N+1) precedence values between each assigned precedence value; and
(b) communicating the N packet filters from a mobile station to a network router.

22. The method of claim 21, wherein a first of the N packet filters is mapped to a communication channel from the network router to the mobile station, wherein the communication channel has an associated quality of service (QoS), wherein the network router determines whether a data packet matches the first of the N packet filters, and if the data packet matches the first of the N packet filters then the data packet is communicated across the communication channel to the mobile station.

23. The method of claim 21, wherein a total precedence space has 2*P values, wherein each precedence value assigned in (a) falls within a range from zero through P−1, and wherein no packet filter is assigned a precedence value that falls within a range from P through (2*P)−1.

24. The method of claim 21, wherein the range from zero through P−1 is a range from a digital value 00000000 through a digital value 01111111, and wherein the range from P through (2*P)−1 is a range from a digital value 10000000 through a digital value 11111111.

25. The method of claim 21, wherein a total precedence space has 2*P values, wherein each precedence value assigned in (a) falls within a range from P through (2*P)−1, wherein no packet filter is assigned a precedence value that falls within a range from zero through P−1, wherein the range from zero through P−1 is a range from a digital value 00000000 through a digital value 01111111, and wherein the range from P through (2*P)−1 is a range from a digital value 10000000 through a digital value 11111111.

26. A non-transitory processor-readable medium for storing instructions operable in a wireless device to:
 (a) assign a precedence value to each of N packet filters, wherein each precedence value assigned to each of the N packet filters falls within a currently unassigned precedence space, wherein the currently unassigned precedence space has P values, and wherein there are approximately one less than $(P+1)/(N+1)$ values between each assigned precedence value; and
 (b) communicate the N packet filters from a mobile station to a network router.

27. The processor-readable medium of claim 26, wherein a total precedence space has $2*P$ values, wherein each precedence value assigned in (a) falls within a range from zero through P−1, and further for storing instructions operable in the wireless device to:
 (c) assign a new precedence value to each of the N packet filters. wherein each of the new precedence values assigned to each of the N packet filters falls within a reserved precedence space, wherein the reserved precedence space has P values that fall within a range from P through $(2*P)-1$.

28. The processor-readable medium of claim 27, and further for storing instructions operable in the wireless device to:
 (d) assign a precedence value to each of F packet filters, wherein each precedence value assigned to each of the F packet filters falls within the reserved precedence space, and wherein there are approximately one less than $(P+1)/(N+F+1)$ values in the reserved precedence space between each precedence value assigned in (c) and in (d).

29. The processor-readable medium of claim 28, wherein steps (a) through (d) are performed by system software executing on a mobile communication device.

30. The processor-readable medium of claim 28, and further for storing instructions operable in the wireless device to:
 (e) communicate the P packet filters from the mobile station to the network router, wherein the P packet filters are communicated from the mobile station to the network router in an RSVP Resv message, and wherein the network router is a packet data serving node (PDSN).

31. A mobile station, comprising:
 an application that supplies N packet filters; and
 means for assigning a precedence value to each of the N packet filters, wherein each precedence value assigned to each of the N packet filters falls within a currently unassigned precedence space, wherein the currently unassigned precedence space has P values, and wherein the precedence value assigned to each $n^{th}$ packet filter from one through N has a value approximately equaling $n*[(P+1)/(N+1)]$.

32. The mobile station of claim 31, wherein the mobile station complies with a wireless specification called 3GPP2 C.S0024.

33. The mobile station of claim 31, wherein the mobile station complies with a wireless specification called 3GPP TS 24.008.

34. The mobile station of claim 31, wherein each precedence value assigned to each of the N packet filters is communicated to a network router.

35. A mobile station comprising:
 a microprocessor adapted to run an application, wherein the application receives data packets, wherein the data packets are filtered by packet filters on a network router, and wherein each of the packet filters is assigned a precedence value; and
 means for spreading out over a first portion of a precedence space the precedence values assigned to the packet filters and for reassigning the precedence values of the packets filters to a second portion of the precedence space that was previously unassigned, wherein each of the packet filters has a priority, wherein the means reassigns the precedence values of the packet filters to the second portion of the precedence space when there are insufficient unassigned precedence values in the first portion of the precedence space to accommodate the packet filters while maintaining the priority of each of the packet filters.

36. The mobile station of claim 35, wherein the precedence values that are reassigned to the second portion of the precedence space are spread out over the second portion of the precedence space.

37. The mobile station of claim 35, wherein the means comprises an application programming interface (API) and a protocol stack.

* * * * *